G. W. FERGUSON.
COOKER.
APPLICATION FILED SEPT. 7, 1909.
968,925.
Patented Aug. 30, 1910.
2 SHEETS—SHEET 1.
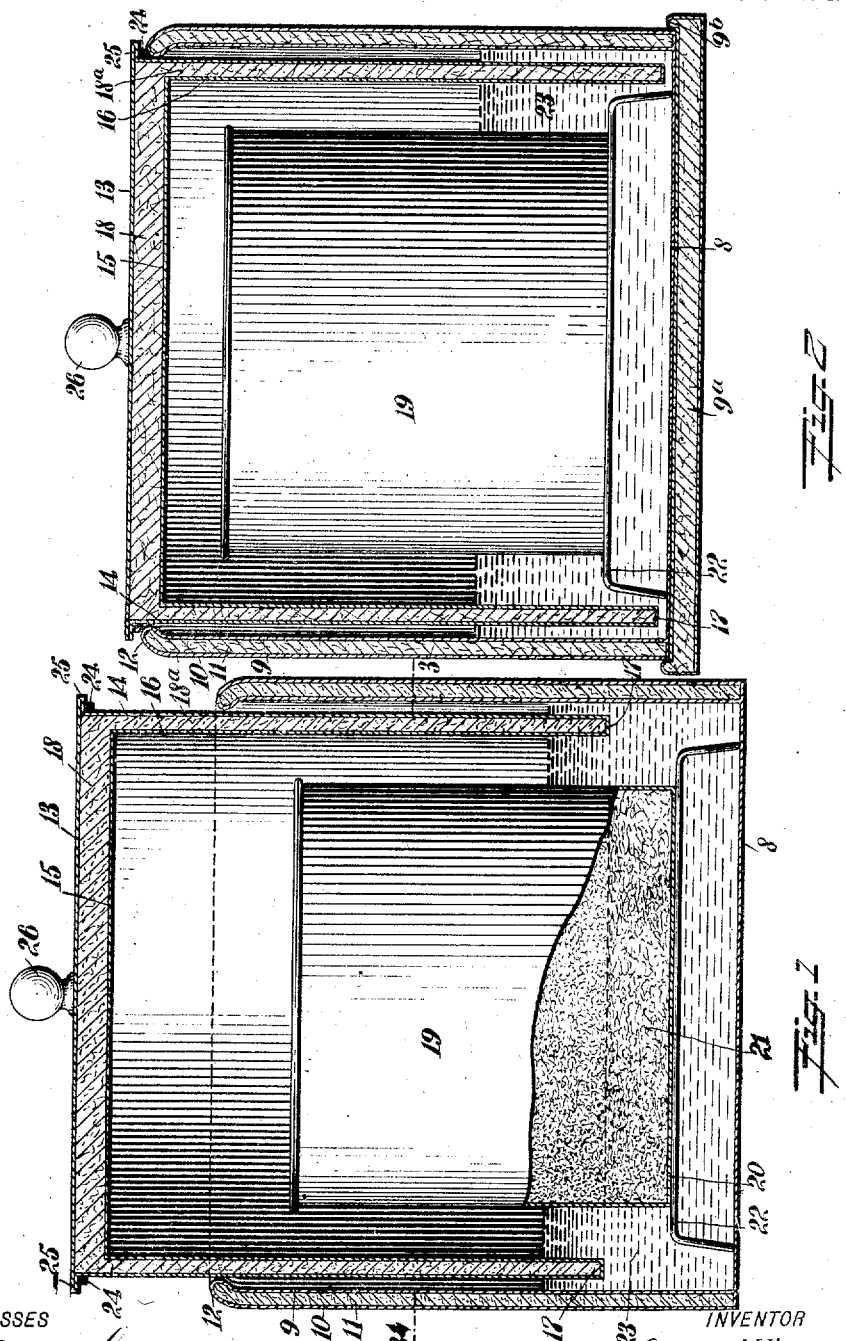

G. W. FERGUSON.
COOKER.
APPLICATION FILED SEPT. 7, 1909.
968,925.
Patented Aug. 30, 1910.
2 SHEETS—SHEET 2.
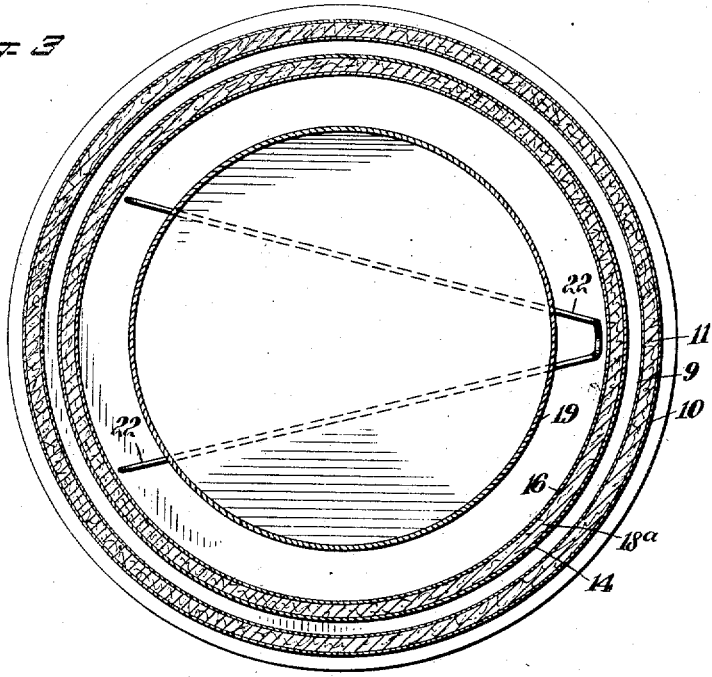
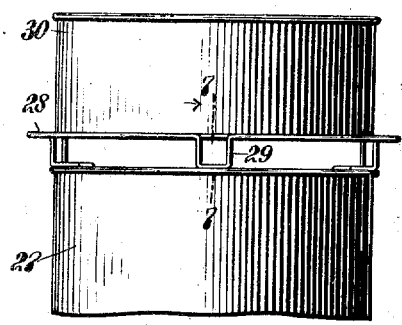
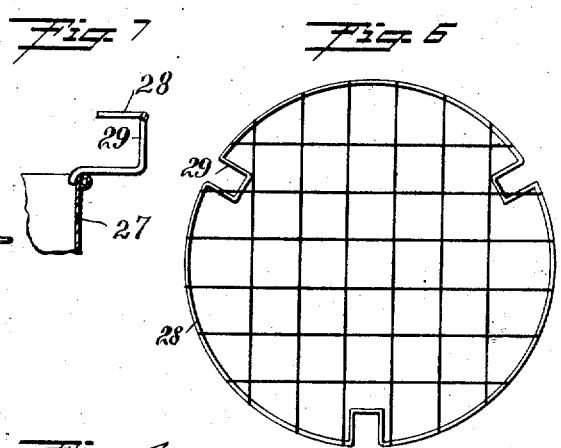
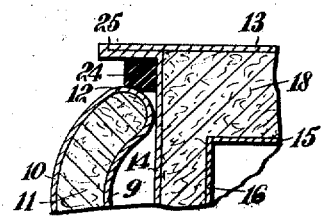
WITNESSES
E. G. Bromley.
W. Harrison.
INVENTOR
George W. Ferguson
BY Munn & Co
ATTORNEYS

UNITED STATES PATENT OFFICE.

GEORGE WASHINGTON FERGUSON, OF SHEBOYGAN, WISCONSIN.

COOKER.

968,925.  Specification of Letters Patent.  Patented Aug. 30, 1910.

Application filed September 7, 1909. Serial No. 516,832.

*To all whom it may concern:*

Be it known that I, GEORGE WASHINGTON FERGUSON, a citizen of the United States, and a resident of Sheboygan, in the county of Sheboygan and State of Wisconsin, have invented a new and Improved Cooker, of which the following is a full, clear, and exact description.

My invention relates to cookers, my more particular purpose being to provide a form of device of this character suitable for use as a fireless cooker, or simply as a cooker to which heat is constantly supplied until the operation is completed.

My invention relates more particularly to various constructional details whereby the efficiency of cookers is increased.

Reference is to be had to the accompanying drawings forming a part of this specification, in which similar characters of reference indicate corresponding parts in all the views.

Figure 1 is a substantially central, vertical section through my improved cooker complete, showing it in action as when heat is supplied to it constantly; Fig. 2 is a central vertical section through the cooker, showing it as it appears when used as a fireless cooker; Fig. 3 is a horizontal section upon the line 3—3 of Fig. 1, looking in the direction of the arrow and showing the wire support for holding the cooking vessel in position; Fig. 4 is a detail, showing how the outer double-walled receptacle is bent slightly inward at its top, for purposes hereinafter described, this view also showing the buffer ring used upon the floating bell; Fig. 5 is a reduced fragmentary side elevation showing a different form of cooking vessel from that appearing in Figs. 1 to 3 inclusive, and also showing an additional receptacle mounted over the cooking vessel and spaced therefrom in order to permit the free circulation of steam or the like; Fig. 6 is a plan view of the wire support used for supporting one cooking vessel above another and also for supporting articles to be steamed; and Fig. 7 is a detail sectional view on the line 7—7 of Fig. 5, showing one of the supporting lugs carried by the wire frame appearing in Fig. 6.

Connected rigidly with a disk-shaped bottom 8, are inner and outer walls 9 and 10, and disposed intermediate these walls is a packing 11 of asbestos, mineral wool or a similar material which is a non-conductor of heat. The two walls 9, 10, are connected together by an integral portion 12 and, with this portion, are bent slightly inward. A disk 13 is mounted upon a cylindrical wall 14, and below the disk 13 is another disk 15 which is connected with a cylindrical wall 16. The cylindrical walls 14, 16, are connected together by an annular portion 17. Between the disks 13 and 15 is a packing 18 provided with a cylindrical portion 18ᵃ extending downwardly intermediate the walls 14, 16. The cooking vessel 19 is provided with a bottom 20 and is adapted to hold a quantity of food 21 to be cooked. A wire support 22, having generally a V-shaped form, as indicated in Fig. 3, is rested upon the bottom 8 so as to support the cooking vessel 19 out of engagement with the bottom.

The apparatus thus described constitutes essentially an outer vessel having the inner and outer walls 9, 10, and movable relatively to this vessel and inserted partially therein, is an inner vessel comprising the inner and outer walls 14, 16. This inner vessel is essentially a bell which rests upon a quantity of liquid 23 contained in the outer vessel. A buffer ring 24 made of rubber encircles the inner vessel which is provided with a flange 25 against which the buffer ring lodges.

The inner receptacle or bell is provided with a handle 26, whereby it may be raised out of the outer receptacle.

As shown in Fig. 2 at 9ᵃ is a double-walled asbestos-filled pad entirely separate from the outer wall of the cooker, but provided with an upturned bead 9ᵇ, into which the base of the outer receptacle may be set, as indicated in Fig. 2.

In Fig. 6 is shown a wire grid 28, provided with feet 29, the latter being bent slightly downward and inward. This wire grid is placed upon a cooking vessel 27, which may be of a type a little different from the cooking vessel 19, and another cooking vessel 30 may now be rested upon the wire support or wire grid 28. By this means, cooking may be done in two cooking vessels at the same time. If desired, the grid 28 may be used to support any articles to be steamed or subjected continuously to heat.

The operation of my device is as follows: The parts being in position, as indicated in Figs. 1, 2 and 3, the food 21 is placed in the cooking vessel 19 and a quantity of water 23 is placed in the outer receptacle. The bell or inner receptacle is lowered in position as indicated in Fig. 1, and heat being now applied against the bottom 8, the cooking begins. Steam is generated in the water 23, and fills the bell so as to raise it. At intervals the supply of steam becomes excessive, and the buoyancy of the bell being correspondingly increased, the bell is raised to a sufficient height to allow the steam to escape. Thus the steam forms bubbles in the lower side of the bell and passes upwardly between the bell and the outer receptacle. The inturned portion 12 on the outer receptacle serves as a guiding flange for centering the bell. This, of course, leaves quite a wide space between the receptacle and the outer surface of the bell. The steam passing upwardly through said space, serves to keep the heat uniform around the bell and also conserves heat to a great extent, thereby promoting economy of fuel. If the quantity of water 23 becomes reduced beyond certain limits, the flange 25 comes into close contact with the portion 12 of the outer receptacle. When this takes place, the escape of further bubbles from the bell causes the bell to move up and down and to bump against the top of the outer vessel. A noise is thus produced and the operator's attention thereby attracted. Further, when this occurs, there is no need for excessive haste in replacing the quantity of water, as a few minutes is required for all of the water to evaporate out of the outer vessel after this warning is given. The buffer ring 24 serves to cushion the flange 25 against the inturned portion 12 of the outer vessel, and this prevents the noise from becoming unduly obnoxious, and also prevents injury to the outer vessel in consequence of movements of the bell. Suppose now it is desired to use the device as a fireless cooker. For this purpose the operation above described in respect to Fig. 1 is carried on to the point where steam is generated in the bell and raises the latter so as to expel the steam or a portion thereof. The outer receptacle, carrying the inner receptacle, is now removed from the fire and placed upon the pad 9ª. This pad, being double-walled and containing asbestos or other material of low heat conductivity, prevents the ready escape of heat from the water and also from the vessels. The apparatus being left alone, the bell soon descends into the position indicated in Fig. 2, so that the buffer ring 24 rests upon the inturned portion 12 of the outer receptacle. But little heat can now make its escape, and the cooking proceeds as in any other fireless cooker.

In the form shown in Fig. 5, the cooking vessel 27 may contain one kind of food and the cooking vessel 30 may contain another kind of food, or may contain any article to be steamed or heated. The wire grid simply supports the cooking vessel 30 so as to allow a free circulation of steam, as between the cooking vessels 27 and 30. Except as just indicated, the operation of the device shown in Fig. 5 is substantially the same as that indicated in Figs. 1 and 2. The buffer ring 24, when used as indicated in Fig. 2, however, performs a peculiar function; a slight condensation taking place inside of the bell, the air tends to enter, but is prevented from so doing by the sealing of the buffer ring 24. This is easily accomplished, owing to the shape given to the inturned portion 12 of the outer vessel. The bell, in fact, seals and locks itself air-tight like a self-sealing fruit jar, but without the use of clamps or fasteners of any kind. It should be remembered in this connection, that there is a considerable air pressure upon the top of the bell, owing to the tendency of partial condensation of steam inside of the cooker. If the steam were totally condensed, the air pressure in question would amount to fifteen pounds per square inch, that is, several hundred pounds for a fireless cooker of ordinary size. Since, however, the steam is by no means totally condensed, the partial vacuum is not nearly so perfect as to produce such enormous pressure, but is sufficient to produce enough pressure to make the bell air-tight.

From the above description it will be seen that my cooker, when used with or without heat being constantly supplied to it, employs steam and that this steam cannot burst the apparatus or any part of it because the steam can escape freely by raising the bell. Moreover, it will be seen that the fireless cooker automatically seals itself or, at least, that the bell is automatically sealed relatively to the outer receptacle immediately after the cooker is removed from the fire.

It will also be noted that the use of double walls for the bell for the outer receptacle and for the pad, shown at the bottom of Fig. 2, effectively prevents the escape of heat; also that the pad 9ª, shown at the bottom of Fig. 2, is not at all in the way when heat is to be applied to the bottom 8, the pad coming into use only after such heat has already been applied.

Having thus described my invention, I claim as new and desire to secure by Letters Patent:

1. In a cooker, the combination of a receptacle provided with an outer wall, and an inner wall merging together at the top, and a packing of heat-proof material disposed intermediate said walls, the upper portion of said walls and said packing being bent slightly inward, and a floating bell disposed within said receptacle and encompassed closely about by the upper portion of said first-mentioned receptacle.

2. In a cooker, the combination of a receptacle provided with an inner and an outer wall, and a packing of heat-proof material disposed between said inner wall and said outer wall, said inner wall and said outer wall and said packing therebetween being bent slightly inward, and a bell disposed within said receptacle and circumscribed closely by the portion of said inner and outer walls thus bent inward.

In testimony whereof I have signed my name to this specification in the presence of two subscribing witnesses.

GEORGE WASHINGTON FERGUSON.

Witnesses:
ARNOLD STEIMLE,
PH. J. MUTH.